INVENTOR
LAMBERT J. BORDO
BY
John D. Myers
ATTORNEY

INVENTOR
LAMBERT J. BORDO
BY John D. Myers
ATTORNEY

Patented Apr. 18, 1950

2,504,297

UNITED STATES PATENT OFFICE 2,504,297

PLUG VALVE

Lambert J. Bordo, North Willow Grove, Pa.

Application March 30, 1946, Serial No. 658,468

4 Claims. (Cl. 251—97)

The invention relates to plug valves, and is directed specifically to a plug valve which is so constructed that a plug of substantially tapered form may be adjusted into different positions in order to control the extent to which the plug may be seated in the tapered opening provided therefor in the valve casing.

One of the principal objects of the invention is the provision, in a plug valve, of a structure whereby the plug which serves to control the passageway through the valve may be easily and quickly seated so as to prevent leakage around the plug. Another object of the invention is the provision, in such a valve, of a structure whereby the plug may be moved longitudinally to a limited extent so as to unseat it in order to provide for easier rotation of the plug as the valve is turned on and off. It is also an object of the invention to provide a structure whereby the valve plug may be secured against longitudinal movement in a direction serving to unseat it. A further object of the invention is the provision of a structure whereby the valve plug may be easily and quickly seated to such an extent in its tapered opening as to secure it against accidental movement out of any position in which it may be set. It is another object of the invention to provide, in a plug valve, a structure in which the plug-actuating and plug-adjusting spindles are effectively sealed against the medium controlled by the valve. A still further object of the invention is the provision, in a plug valve, of a structure whereby the closure portion of the plug cooperates with its seat in such a manner as to provide a shearing operation and thus minimize the tendency of particles of solid or semi-solid matter in the controlled medium to interfere with the normal operation of the valve. Additional objects and advantages of the improved features will be apparent from the following description, taken with the accompanying drawing wherein:

Figure 1:
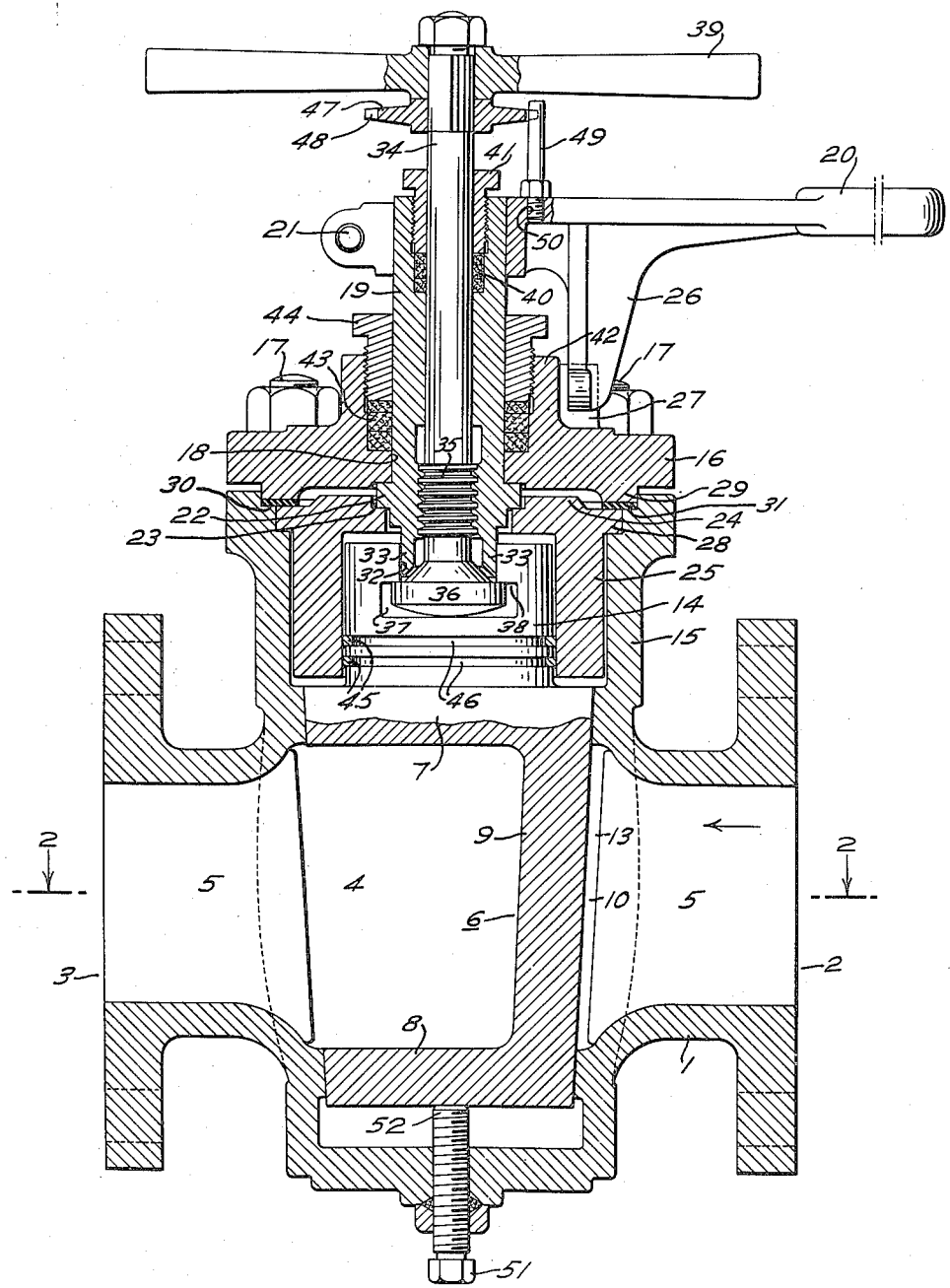
Fig. 1 is a vertical, longitudinal sectional view of a straightway valve having the present improvements incorporated therein.
Figure 2:
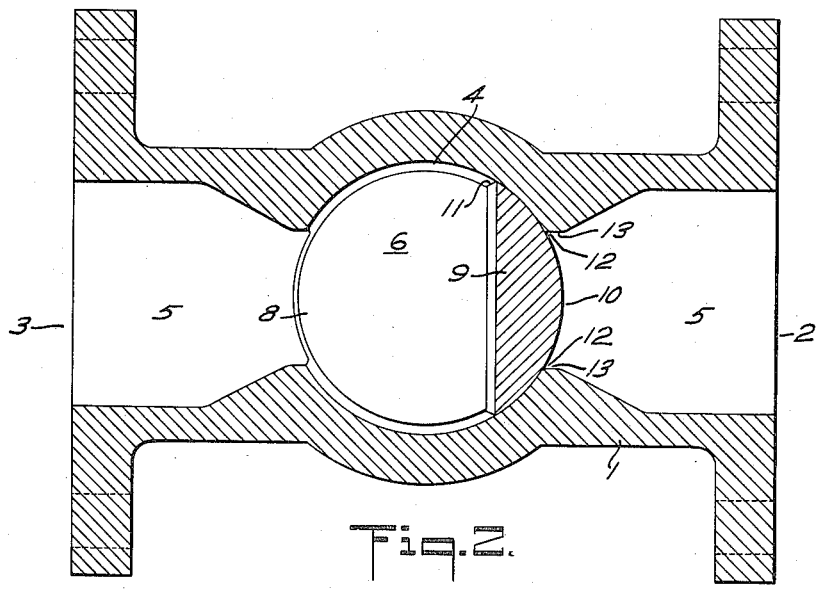
Fig. 2 is a transverse sectional view taken on the line 2—2 of Fig. 1.

As disclosed in Figs. 1 and 2 of the drawing, the invention is embodied in a straightway valve comprising a casing 1 having an inlet port 2, an outlet port 3, and a tapered opening 4 intersecting the passageway 5 between the two ports for receiving a tapered plug member 6 for controlling the passage of fluid medium through the valve. While the plug member 6 may be otherwise formed, as shown in Figs. 1 and 2, it consists essentially of a disk-like member 7 tapered on its periphery so as to fit within the larger end of the tapered plug opening 4, a disk-like member 8 tapered on its periphery so as to fit within the smaller end of the tapered plug opening 4, and a segmental closure portion 9 interconnecting the disk-like members 7 and 8 and having a tapered curved surface 10 conforming to the tapered plug opening. The segmental portion 9 is provided with sharp edges 11 for cooperation with sharply defined edges 12 on the slotted opening 13 in the valve seat at the junction of the passageway 5 with the tapered plug opening 4. A shearing action is thus provided on particles of solid or semi-solid material which may be caught between the opposing edges of the segmental portion and the slotted opening during the rotary movement of the plug into closed position, thus preventing such particles from interfering with the proper operation of the valve.

The larger end of the plug 6 is provided with a reduced cylindrical extension 14 formed centrally on the disk-like member 7 and projecting outwardly into a housing 15 which forms an extension of the tapered valve opening 4. The housing 15 is closed by a bonnet 16 which may be secured thereon in any suitable manner, such as by bolts 17.

The bonnet 16 is provided with a central aperture 18 for receiving a hollow plug-actuating spindle 19 having a handle 20 fitted on its outer end and secured thereon by a clamping bolt 21. A ruff 22 on the hollow spindle 19 engages with the inner face of the bonnet to prevent movement of the hollow spindle outwardly. The hollow spindle is restrained against movement in the opposite direction by engagement of the ruff 22 with the peripheral edge of an opening 23 in the end wall 24 of a retaining cap 25 which encloses the cylindrical extension 14. Movement of the handle 20, and consequently turning of the hollow spindle 19 and plug 6, may be limited by the engagement of a lateral projection 26 with suitable stops 27 on the bonnet 16.

The outer edge of the end wall 24 of the retaining cap is supported on a shoulder 28 in the housing 15. An annular rib 29 on the inner face of the bonnet, and seated on an annular shoulder 30 in the outer end of the housing 15, extends inwardly over the outer edge of the end wall 24 so as to hold the retaining cap 25 in position. Packing material 31 between the rib 29 and the end wall 24 serves to prevent leakage of liquid medium outwardly around the retaining cap 25.

The inner end of the hollow spindle 19 projects into a slot 32 in the outer end of the reduced extension and is provided with oppositely arranged flats 33 which engage with the edges of the slot so that turning movement of the hollow spindle will be transmitted to the plug 6. With such inter-connecting means between the hollow spindle 19 and the plug, it will be apparent that the plug is free to move longitudinally with respect to the spindle 19 although it is fixed against rotational movement with respect thereto.

The improved means which I have devised for moving the plug 6 longitudinally with respect to the hollow spindle 19 and the tapered plug opening 4 comprises an adjusting spindle 34 extending through the hollow spindle 19 and in threaded engagement therewith for a portion of its length as shown at 35. The inner end of the adjusting spindle 34 is provided with a head 36 positioned in an undercut 37 extending transversely of the reduced extension 14 and opening outwardly through the periphery on one side thereof to permit the assembly of these parts. The undercut 37 communicates with the outer end of the reduced extension through the slot 32 heretofore described.

The extreme end of the head 36 is in engagement with the bottom of the undercut 37 and its edge engages with the over-hanging portions 38 which form the edges of the slot 32. As will be apparent with such a construction, relative turning movement of the adjusting spindle 34 with respect to the hollow spindle 19 will operate to move the plug 6 longitudinally in one direction or the other with respect to the hollow spindle and the tapered plug opening 4. It will be understood, of course, that only a slight movement of the plug in this manner is required for the purpose of seating it properly in the tapered plug opening and in unseating it for easy turning movement. A hand wheel 39 or other suitable means may be secured on the outer end of the adjusting spindle 34 for the purpose of rotating it.

The outer end of the hollow spindle 19 may be provided with an inside enlargement to form a stuffing box in which packing material 40 may be held in place around the spindle 34 by a gland 41. A stuffing box may also be formed for the hollow spindle 19 by an annular extension 42 on the outer face of the bonnet. The packing material 43 in this stuffing box may be held therein by a gland 44. Leakage of fluid medium outwardly between the reduced extension 14 and the retaining cap 25 may be prevented by providing suitable packing means between the extension and the peripheral wall of the cap. In view of the high temperatures to which a valve of this particular construction is often subjected when in use, it has been found that a satisfactory packing may be provided by the use of one or more split rings, such as piston rings 45, positioned in grooves 46 in the extension 14 and thus sealing the space between the extension and the retaining cap against the passage of fluid.

The present improvement also provides means for securing the valve-actuating spindle 19 and the valve-adjusting spindle 34 against relative rotational movement when the valve plug has been adjusted to the desired position. This means comprises a disk 47 mounted on the outer end of the adjusting spindle 34 beneath the hand wheel 39 and provided with serrations 48 on outer edge, and a locking pin 49 threaded in an opening 50 in the handle 20. When it is desired to effect longitudinal adjustment of the plug 6 for the purpose of seating or unseating it, the locking pin 49 may be removed from the handle 20 whereupon the spindle 34 may be freely turned relatively to the hollow spindle 19 by means of the hand wheel 39. When the desired longitudinal adjustment of the plug is effected, the two spindles may be secured against relative rotational movement by threading the inner end of the locking pin 49 in the opening 50, with its outer end seated in one of the serrations 48.

Longitudinal adjustment of the plug 6 in the tapered opening 4 may be facilitated by the use of adjustable stop means, such as an adjusting screw 51 threaded through the wall of the valve casing, with its inner end 52 arranged to be set in contact with the smaller end of the plug. With the use of such a stop device, the desired longitudinal adjustment of the plug may be effected by the adjusting spindle 34 as described above, whereupon the adjusting screw 51 may be turned into contact with the inner end of the plug to thereafter limit further movement of the plug inwardly so that its proper setting may be easily effected and thus balanced for easy operation.

Figure 3:
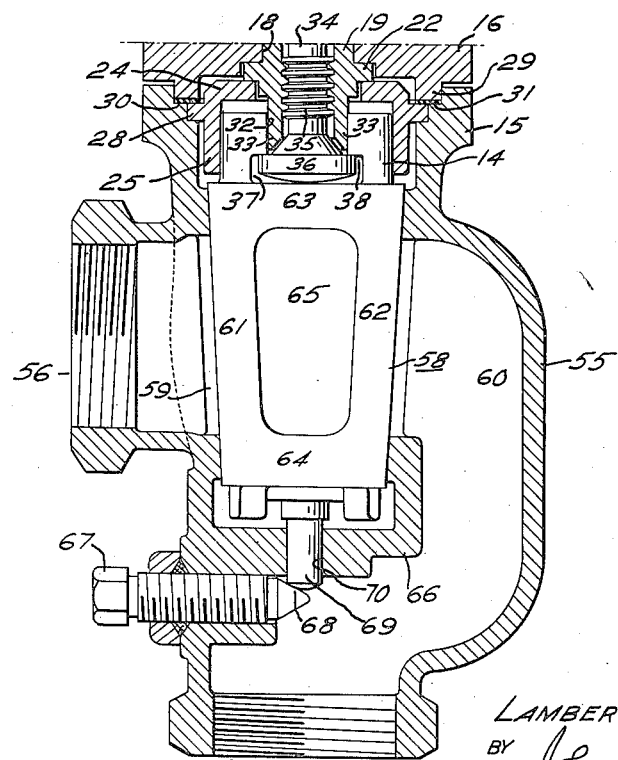
Fig. 3 is a vertical, longitudinal sectional view of a portion of an angle type valve, showing the manner in which the present improvements may be incorporated therein.

In Figure 3 of the drawing there is shown a construction by means of which certain features of the present invention may be incorporated in an angle type of valve. In this construction, the valve comprises a casing 55 having two ports 56 and 57 arranged substantially at right angles to each other, and the plug element 58 is positioned in a valve cage 59 formed on the inside of the casing, adjacent to one of the ports. The cage 59 is substantially spaced from one wall of the casing in order to provide a passageway 60 from one port to the other through the cage. The plug 58 is of the solid type, having two segmental portions 61 and 62, connected by upper and lower disk-like members 63 and 64, thus providing a transverse opening 65 which may be turned into and out of alignment with the passageway 60. It will be obvious, however, that other forms of plug may be used, such as the one described above and shown in Figs. 1 and 2.

When the plug 58 is seated its lower end is spaced from the lower wall 66 of the cage in order to provide for such longitudinal movement of the plug as may be required in adjusting it in the manner described above. With this form of valve, however, the adjustable stop means for limiting the inward movement of the plug with respect to its seat includes an adjusting screw 67 threaded through the side wall of the casing 55 and having a tapered inner end 68. The tapered end 68 is arranged for engagement with the curved lower end of a pin 69 slidably supported in an opening 70 in the bottom wall of the cage 59 and having its upper end arranged for engagement with the inner end of the plug. With such a structure, it will be apparent that the desired setting of the plug longitudinally in its seat may be very accurately controlled. The other features of this type of valve, such as the plug rotating and adjusting spindles, do not differ materially from the corresponding features shown in Figs. 1 and 2, and further description thereof is therefore unnecessary.

While certain forms of the improvement have been disclosed together with certain arrangements of the various parts, it is to be understood that the invention is not limited to the precise structure and arrangement disclosed. The above description and the accompanying drawing are therefore to be regarded as illustrative only, and it is to be understood that the invention is susceptible of other forms and arrangements so long as they come within the scope of the appended claims.

What I desire to claim is:

1. A valve structure comprising a casing having a passage-way therethrough provided with inlet and outlet ports arranged substantially at right angles to each other and with a tapered plug-opening intersecting said passageway, a tapered plug fitting within said plug-opening, a bonnet on the larger end of said plug-opening and having a central aperture therein, a hollow spindle rotatably supported in said aperture and fixed against longitudinal movement therein, inter-connecting means between said hollow spindle and said plug for turning said plug upon rotation of said hollow spindle and for providing limited longitudinal movement of said plug with respect to said hollow spindle, a plug-adjusting spindle rotatably supported in said hollow spindle and having threaded engagement therewith, co-operating means on the inner end of said plug-adjusting spindle and said plug for moving said plug longitudinally with respect to said plug-opening and said hollow spindle upon rotation of said plug-adjusting spindle, means for independently rotating said spindles, a transverse wall in said casing adjacent the smaller end of said plug, an adjusting pin slidably mounted through said wall for engagement of its inner end with the smaller end of said plug, and an adjusting screw threaded through the wall of said casing at right angles to said pin and having a tapered inner end in engagement with the outer end of said pin.

2. A plug valve structure comprising a casing provided with a tapered plug-opening, a tapered plug in said plug-opening, a reduced cylindrical extension on the larger end of said plug, a bonnet on the larger end of said plug-opening and having a central aperture therein, a hollow plug-actuating spindle extending through said aperture and connected to said extension, a ruff on said hollow spindle for engaging with the inner face of said bonnet, a retaining cap enclosing said extension and having an end wall engaging with said ruff and provided with a central aperture to receive said hollow spindle, a plug-adjusting spindle threaded in said hollow spindle and connected to said extension, sealing means between the outer edge of said end wall and said bonnet, and packing means between said reduced extension and said retaining cap to protect said spindles from the fluid passing through said valve.

3. A valve structure as defined in claim 2 wherein said packing means comprises one or more split rings.

4. In a plug valve, a tapered plug element, a reduced cylindrical extension on the larger end of said plug element and having a transverse undercut communicating with the peripheral surface of the extension and opening outwardly through a slot in the outer end of the extension, a hollow spindle having one end positioned in said slot for rotating said plug element, a plug-adjusting spindle threaded in said hollow spindle and having a head positioned in said undercut for moving said plug element longitudinally with respect to said hollow spindle upon rotation of said plug-adjusting spindle with respect to said hollow spindle, and a retaining cap enclosing said extension and having a central opening in its closed end to receive said hollow spindle.

LAMBERT J. BORDO.

REFERENCES CITED

The following references are of record in the file of this patent:

UNITED STATES PATENTS

| Number | Name | Date |
|---|---|---|
| 109,906 | Hutson | Dec. 6, 1870 |
| 1,138,531 | Birkbeck | May 4, 1915 |
| 1,669,844 | Sparks | May 15, 1928 |
| 1,754,424 | Goldberg | Apr. 15, 1930 |
| 1,778,785 | Gish | Oct. 21, 1930 |
| 2,149,725 | Canariis | Mar. 7, 1939 |

FOREIGN PATENTS

| Number | Country | Date |
|---|---|---|
| 475,199 | Germany | Apr. 19, 1929 |